United States Patent [19]

Kalina

[11] Patent Number: 5,011,215
[45] Date of Patent: Apr. 30, 1991

[54] ESCAPE DOOR SYSTEM

[76] Inventor: Benjamin F. Kalina, Box 377, Bowman, N. Dak. 58623

[21] Appl. No.: 556,649

[22] Filed: Jul. 20, 1990

[51] Int. Cl.⁵ .............................................. B60J 9/02
[52] U.S. Cl. .................................... 296/146; 49/141; 292/DIG. 65
[58] Field of Search .................. 296/257, 178; 49/141, 49/149, 463; 292/DIG. 65

[56] References Cited

U.S. PATENT DOCUMENTS

| | | | |
|---|---|---|---|
| 3,445,963 | 5/1969 | Gilbert et al. | 49/141 |
| 3,940,886 | 3/1976 | Ellington, Jr. | 49/141 |
| 4,216,725 | 8/1980 | Hallman | 296/146 |
| 4,414,777 | 11/1983 | Masacchia | 49/141 |
| 4,816,807 | 3/1989 | Schmitt | 49/141 |
| 4,879,842 | 11/1989 | Bailey | 49/141 |

Primary Examiner—Robert R. Song
Attorney, Agent, or Firm—Dean P. Edmundson

[57] ABSTRACT

An escape door system for a bus is described which can be easily and quickly opened to enable passengers to exit the bus after an accident. The door can be used as a normal exit door or it may be completely detached and separated from the bus. Preferably the door is installed in the rear wall of the bus. A window adjacent the door can also be pivoted out of the way after the door has been separated from the wall to facilitate ingress and egress of people.

19 Claims, 2 Drawing Sheets

ESCAPE DOOR SYSTEM

FIELD OF THE INVENTION

This invention relates to escape door systems in vehicles. More particularly, this invention relates to exit or escape doors for passenger buses. Even more particularly, this invention relates to escape doors for conventional school buses.

BACKGROUND OF THE INVENTION

Accidents involving buses are not uncommon. Normally the more serious of such accidents involve school buses with children on board as passengers.

Although buses (especially school buses) typically have a rear exit door, sometimes it is difficult to open the door to allow people to escape from the bus after an accident. This can be a particularly difficult and serious problem when the bus has been tipped over on its side and it is necessary to lift the weight of the rear door in order to open it. Oftentimes the children do not have sufficient strength to lift the door to enable children to escape, or the time required to open the door is greater than desired, particularly when there is a fire.

There has not heretofore been provided an escape door system for a bus which is easy to open and which can be opened quickly even if the bus has been tipped on its side.

SUMMARY OF THE PRESENT INVENTION

In accordance with the present invention there is provided an escape door system for a bus (e.g., a conventional school bus) which can be easily and quickly opened after an accident to allow passengers to exit the bus and not be trapped. In one embodiment there is provided an escape door system comprising:

(a) an escape door having first and second opposite side edges; wherein the door normally encloses an escape opening in the wall of the bus;

(b) at least one aperture in the wall of the bus adjacent the escape opening;

(c) at least one tab member carried by the first side edge of the door, wherein the tab member projects through the aperture;

(d) retention means for retaining the tab member in the aperture and being movable between a first position in which the tab member is locked, and a second position in which the tab member is unlocked.

The escape door can be completely separated from the wall member when the tab member is unlocked. Preferably the escape door is present in the rear wall of the bus, although it could be used in a side wall, if desired. There could also be more than one such escape door in a bus.

It is expected that the escape door system of this invention will have primary utility in school buses, although it can be used equally as well in commercial or private buses also. One of the main advantages of this system is that the escape door can be completely detached from the bus easily and quickly after an accident. This allows the passengers to escape, or to be removed, reasonably rapidly. Incidence of serious injury is thereby reduced. It is not necessary to lift the weight of the door in order to open it.

Other advantages of the escape door system of the invention will be apparent from the following detailed description.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
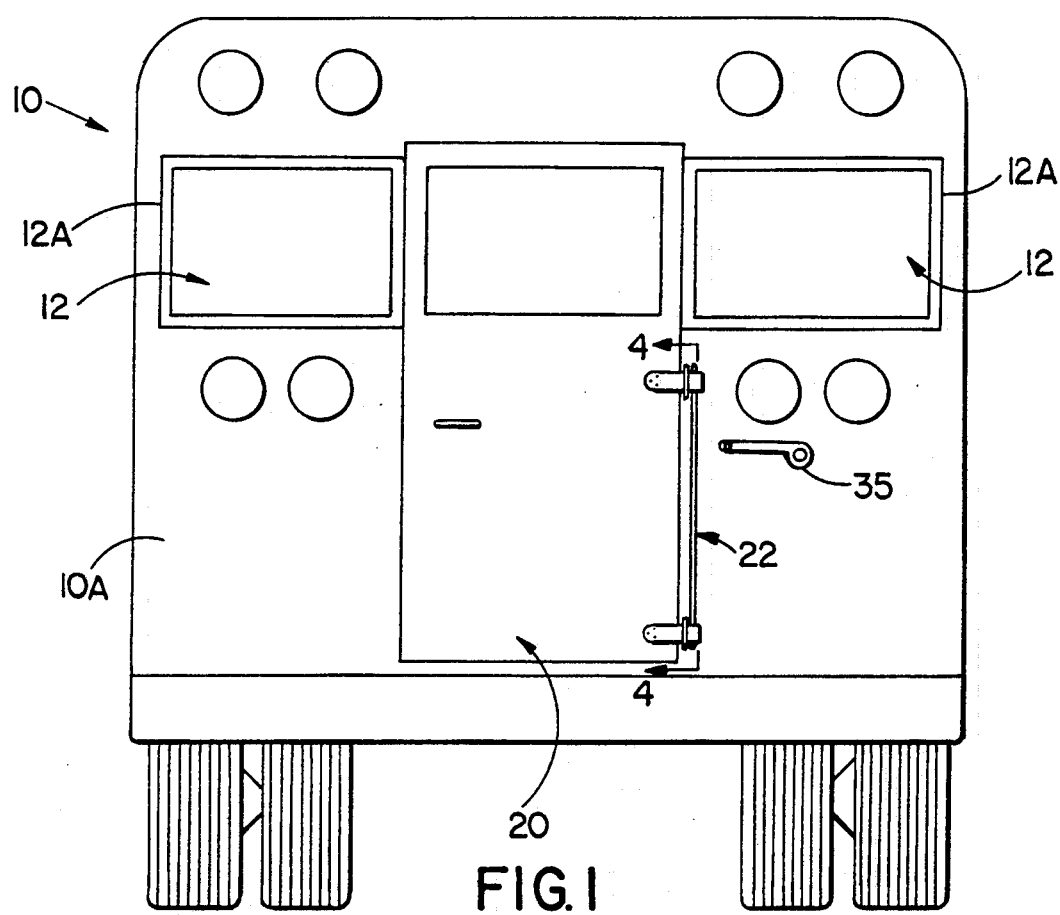
FIG. 1 is a rear elevational view of a school bus which includes the escape door system of this invention.

In the drawings there is illustrated a school bus 10 having a rear wall 10A which includes one embodiment of an escape door system of this invention. Escape door 20 is normally centered on the rear wall of the bus, as shown. Windows 12 in this invention are preferably hinged on the outside edge 12A to the rear wall of the bus. The inside edge of each window 12 is preferably captured or retained in closed position by means of opposite side edges of the rear door 20. Thus, when the rear door is closed the windows 12 are prevented from opening.

Conventionally the rear door of a bus is hinged at one side to enable the door to swing outwardly. But in a conventional bus that is the only way to open the rear door to permit egress of passengers. If a bus is tipped on its side, it is not easy to open the rear door to allow passengers to exit. This is particularly true when the bus tips onto the side opposite that on which the rear door is hinged. Then it is necessary to lift the rear door in order to open it to allow escape from the interior of the bus.

In the present invention the rear door 20 includes a tab member 22 secured to one side edge thereof. In the embodiment shown in the drawings the tab comprises an elongated bar. Preferably the bar is mounted to the side edge of the door by means of hinges 21 such that the rear door can still be unlatched and swung outwardly in the normal manner, if desired.

The elongated bar 22 is adapted to be slidingly inserted into an elongated vertical aperture 11 in the rear wall 10A. When the bar is secured in this aperture, the door 20 encloses the escape opening in the rear wall and the door is held securely in place for normal usage.

Figure 3:
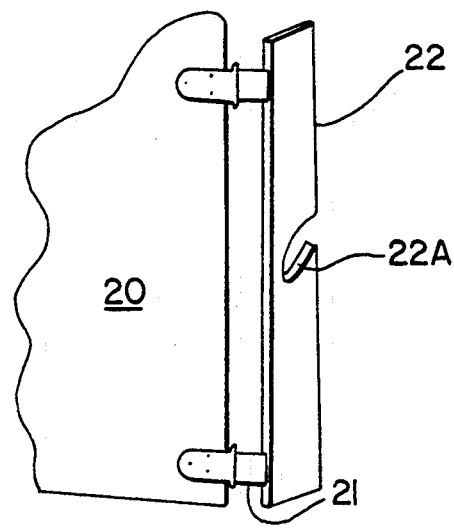
FIG. 3 is a perspective view of an edge portion of an escape door of the invention.

Preferably the elongated bar 22 includes at least one angled slot 22A in its leading side edge (as shown in FIG. 3). After the bar 22 has been inserted through aperture 11, an arm 30 can be fitted into the slot 22A on the interior side of rear wall 10A to prevent the bar 22 from moving rearwardly out of the aperture 11. Preferably arm 30 is pivotably mounted at one end on bolt or pin 31. If desired, a spring bias means 32 carried on the interior side of wall 10A can be used to urge arm 30 downwardly to a normal engaging position. End 30A of arm 30 may comprise a handle to facilitate lifting of the arm when it is desired to free the tab or bar 22 to cause separation of the door 20 from the rear wall.

Figure 2:
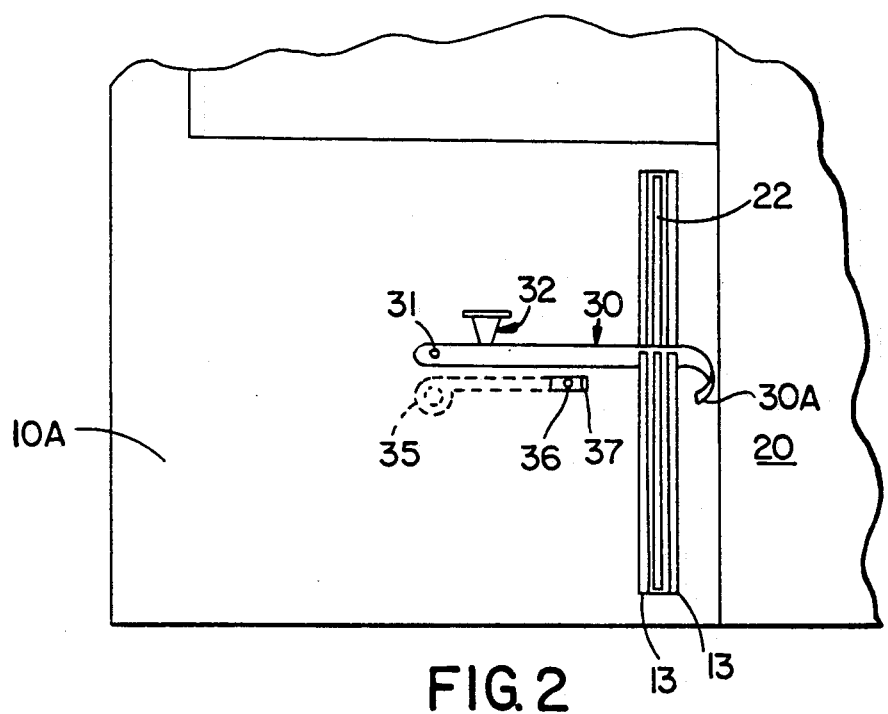
FIG. 2 is an elevational view of the rear wall of the bus, viewed from the inside of the bus.
Figure 5:
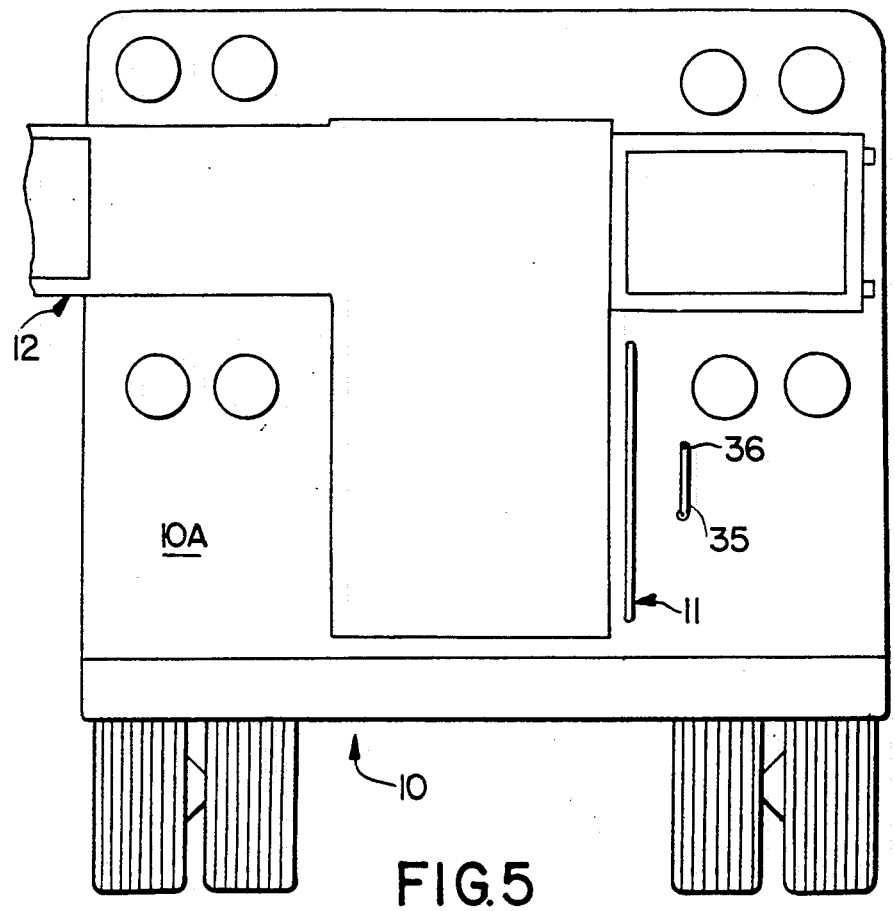
FIG. 5 is a rear elevational view showing the bus of FIG. 1 after it has been tipped on its side and the escape door separated from the rear wall of the bus.

An optional release lever 35 is also illustrated in FIGS. 1 and 2. This lever is accessible on the exterior side of the rear wall 10A. It is pivotably mounted and connected to pin or bolt 36. On the interior side there is a lift arm 37 which is pivoted upwardly when lever 35 is pivoted downwardly. In this manner, lift arm 37 engages the underside of arm 30 and causes it to be raised out of slot 22A in elongated bar member 22 to release the rear door. Thus, release lever 35 may optionally be used to release the rear door from the outside (or arm 30 may be used to release the rear door from the inside of the bus).

Figure 4:
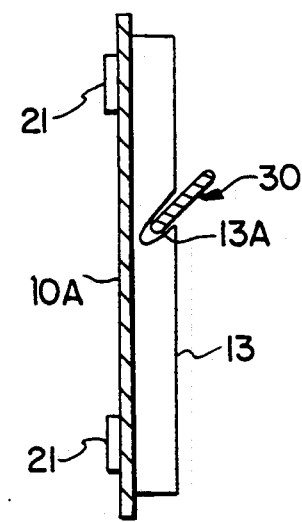
FIG. 4 is a cross-sectional view taken along line 4—4 in FIG. 1.

Preferably the vertical aperture 11 in the rear wall of the bus is defined by spaced-apart parallel rib members 13 which are composed of heavy and sturdy metal plate or bar material. Each such rib member includes an angled slotted aperture 13A, as illustrated in FIG. 4. Apertures 13A in the rib members 13 are in alignment with each other and also with the angled slot 22A in tab or bar 22. Thus, retention arm 30 slidably engages slot 22A and the slots 13A in the rib members 13. This provides a very sturdy connection of the escape door to the rear wall of the bus, yet when the arm 30 is raised the escape door can be completely separated from the rear wall of the bus.

Preferably the vertical aperture 11 extends from a point near the lower edge of the door 20 upwardly approximately one-half the height of the door. Preferably the angled slot 22A in tab 22 is located approximately at the mid-point thereof, as illustrated. Of course, more than one such slot and retaining arm could be used, if desired.

It is also preferable to include a rubber gasket or the like in the aperture 11 for the purpose of keeping dust and dirt from entering the bus through the aperture. Appropriate gasketing may also be included around the edge of the escape door 20 and the windows 12.

Other variants are possible without departing from the scope of this invention.

What is claimed is:

1. An escape door system for a bus having an upright wall member with an escape opening therein, wherein said door system comprises:
   (a) an escape door having first and second opposite side edges; wherein said door encloses said escape opening;
   (b) at least one aperture in said wall member adjacent said escape opening;
   (c) at least one tab member carried by said first side edge of said door, wherein said tab member includes first and second opposite side edges, wherein said first side edge of said tab member is hingedly connected to said first side edge of said door; wherein said second side edge of said tab member projects through said aperture;
   (d) retention means interiorly of said bus for retaining said tab member in said aperture; wherein said retention means is movable between a first position in which said tab member is locked in said aperture, and a second position in which said tab member is unlocked;
wherein said escape door can be separated from said wall member when said tab member is unlocked.

2. An escape door system in accordance with claim 1, wherein said wall member comprises a rear wall of said bus.

3. An escape door system in accordance with claim 1, wherein said wall member includes an interior side, and wherein said retention means is carried by said interior side of said wall member.

4. An escape door system in accordance with claim 3, wherein said aperture comprises an elongated vertical aperture, and wherein said tab member comprises an elongated bar.

5. An escape door system in accordance with claim 4, wherein said wall further includes spaced-apart parallel rib members defining opposite side edges of said aperture.

6. An escape door system in accordance with claim 3, wherein said retention means comprises an elongated arm having a first end which is hingably attached to said interior side of said wall member, wherein said arm is adapted to releasably engage said tab member in said aperture.

7. An escape door system in accordance with claim 6, wherein said aperture comprises an elongated vertical aperture; wherein said tab member comprises an elongated bar; wherein said elongated bar includes a slot; and wherein said arm releasably engages said slot.

8. An escape door system in accordance with claim 2, wherein said rear wall further includes a window adjacent said escape opening; wherein said window is hingably attach-ed to said wall and is movable between open and closed posi-tions when said door has been separated from said wall member.

9. An escape door system in accordance with claim 4, further comprising at least one hinge member secured between said elongated bar and said first edge of said door, wherein said door can pivot between open and closed positions by means of said hinge.

10. An escape door system for a bus having an upright rear wall member with an escape opening therein; wherein said wall member includes an interior side; wherein said door system comprises;
   (a) an escape door having first and second opposite side edges; wherein said door encloses said escape opening;
   (b) at least one aperture in said wall member adjacent said escape opening;
   (c) at least one tab member carried by said first side edge of said door, wherein said tab member includes first and second opposite side edges, wherein said first side edge of said tab member is hingedly connected to said first side edge of said door; wherein said second side edge of said tab member projects through said aperture;
   (d) retention means carried by said interior side of said wall member for retaining said tab member in said aperture; wherein said retention means is movable between a first position in which said tab member is locked in said aperture, and a second position in which said tab member is unlocked;
wherein said escape door can be separated from said wall member when said tab member is unlocked.

11. An escape door system in accordance with claim 10, wherein said aperture comprises an elongated vertical aperture; wherein said tab member comprises an elongated bar; and wherein said wall further includes spaced-apart rib members defining opposite sides of said aperture.

12. An escape door system in accordance with claim 11, wherein said elongated bar includes an angled slot; wherein said retention means comprises an elongated arm having a first end which is hingably attached to said interior side of said wall member; wherein said arm is adapted to releasably engage said elongated bar by means of said angled slot.

13. An escape door system in accordance with claim 12, further comprising at least one hinge member secured between said elongated bar and said first edge of said door, wherein said door can pivot between open and closed positions by means of said hinge.

14. An escape door system in accordance with claim 10, wherein said rear wall further includes a window adjacent said escape opening; wherein said window is hingably attached to said wall and is movable between open and closed positions when said door has been separated from said wall member.

15. An escape door system for a bus having an upright rear wall member with an escape opening therein; wherein said wall member includes an interior side; wherein said door system comprises:
   (a) an escape door having first and second opposite side edges; wherein said door encloses said escape opening;
   (b) an elongated vertical aperture in said wall member adjacent said escape opening;
   (c) an elongated bar member carried by said first side edge of said door, wherein said bar member includes first and second opposite side edges, wherein said first side edge of said bar member is hingedly connected to said first side edge of said door; wherein said second side edge of said bar member projects through said aperture;
   (d) retention means comprising an elongated arm having a first end which is hingably attached to said interior side of said wall member; wherein said arm is adapted to releasably engage said elongated bar member in said aperture;

wherein said escape door can be separated from said wall member when said arm is disengaged from said elongated bar.

16. An escape door system in accordance with claim 15, wherein said wall further includes spaced-apart rib members defining opposite sides of said aperture, wherein said rib members and said elongated bar include slots which are aligned; and wherein said arm releasably engages said slots.

17. An escape door system in accordance with claim 16, wherein said rear wall further includes a window adjacent said escape opening; wherein said window is hingably attached to said wall and is movable between open and closed positions when said door has been separated from said wall member.

18. An escape door system in accordance with claim 16, further comprising at least one hinge member secured between said elongated bar and said first edge of said door, wherein said door can pivot between open and closed positions by means of said hinge.

19. An escape door system in accordance with claim 15, further comprising handle means on the exterior side of said door and being adapted to operate said retention means to release said elongated bar member.

* * * * *